United States Patent

Uechi et al.

(10) Patent No.: US 11,391,201 B2
(45) Date of Patent: Jul. 19, 2022

(54) PLANT AND PLANT OPERATION METHOD

(71) Applicant: MITSUBISHI HEAVY INDUSTRIES, LTD., Tokyo (JP)

(72) Inventors: Hideyuki Uechi, Tokyo (JP); Norihisa Matake, Tokyo (JP); Kouji Horizoe, Tokyo (JP); Shigenori Suemori, Tokyo (JP); Yasutaka Aoki, Tokyo (JP); Yuya Konno, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 615 days.

(21) Appl. No.: 16/472,431

(22) PCT Filed: Jan. 29, 2018

(86) PCT No.: PCT/JP2018/002733
§ 371 (c)(1),
(2) Date: Jun. 21, 2019

(87) PCT Pub. No.: WO2018/139646
PCT Pub. Date: Aug. 2, 2018

(65) Prior Publication Data
US 2021/0131348 A1 May 6, 2021

(30) Foreign Application Priority Data
Jan. 30, 2017 (JP) .............................. JP2017-014204

(51) Int. Cl.
*F02C 1/04* (2006.01)
*F01K 23/02* (2006.01)
(Continued)

(52) U.S. Cl.
CPC ................ *F02C 1/04* (2013.01); *F01K 23/02* (2013.01); *F01K 27/02* (2013.01); *F02C 3/22* (2013.01);
(Continued)

(58) Field of Classification Search
CPC ...... F02C 1/04; F02C 3/22; F02C 6/06; F02C 7/224; F01K 23/02; F01K 27/02;
(Continued)

(56) References Cited

U.S. PATENT DOCUMENTS 6,167,692 B1 * 1/2001 Anand ...................... F02C 3/22
60/39.12
6,336,316 B1    1/2002 Fujii et al.
(Continued)

FOREIGN PATENT DOCUMENTS

JP      2000-240471     9/2000
JP      2005-2996       1/2005
(Continued)

OTHER PUBLICATIONS

Office Action dated Apr. 28, 2020 in counterpart Japanese Patent Application No. 2017-014204 with Machine Translation.
(Continued)

*Primary Examiner* — Hoang M Nguyen
(74) *Attorney, Agent, or Firm* — Wenderoth, Lind & Ponack, L.L.P.

(57) ABSTRACT

A plant includes a fuel supply line for supplying high-pressure fuel gas; and at least one expander disposed in the fuel supply line and configured to extract power from the high-pressure fuel gas by expanding the high-pressure fuel gas.

11 Claims, 11 Drawing Sheets

(51) Int. Cl.
*F01K 27/02* (2006.01)
*F02C 3/22* (2006.01)
*F02C 6/06* (2006.01)
*F02C 7/224* (2006.01)
*H01M 8/04082* (2016.01)
*H01M 8/04701* (2016.01)
*H01M 8/04791* (2016.01)
*H01M 8/0612* (2016.01)

(52) U.S. Cl.
CPC ............... *F02C 6/06* (2013.01); *F02C 7/224* (2013.01); *H01M 8/04201* (2013.01); *H01M 8/04708* (2013.01); *H01M 8/04805* (2013.01); *H01M 8/0618* (2013.01); *F05D 2220/32* (2013.01); *F05D 2220/70* (2013.01); *F05D 2240/35* (2013.01); *H01M 2250/10* (2013.01)

(58) Field of Classification Search
CPC ......... H01M 8/04201; H01M 8/04708; H01M 8/04805; H01M 8/0618; H01M 2250/10; H01M 2250/405; H01M 8/04014; H01M 8/04089; H01M 8/0631; H01M 2008/147; H01M 8/0662; H01M 8/0693; H01M 8/145; F05D 2220/32; F05D 2220/70; F05D 2240/35; F05D 2220/62; Y02B 90/10; Y02E 20/18; Y02E 60/50; Y02E 20/16; B01D 53/62; C01B 32/50; F01D 25/00
USPC ............................................ 60/650, 682–684
See application file for complete search history.

(56) References Cited

U.S. PATENT DOCUMENTS

| 9,163,188 | B2* | 10/2015 | Forsyth | C01B 3/34 |
| 2002/0055026 | A1* | 5/2002 | Lee | H01M 8/04268 |
| | | | | 429/429 |
| 2004/0250998 | A1 | 12/2004 | Charron | |
| 2011/0265445 | A1 | 11/2011 | Botero et al. | |
| 2016/0178129 | A1 | 6/2016 | Chen et al. | |
| 2018/0028965 | A1* | 2/2018 | Tanaka | C10L 3/103 |

FOREIGN PATENT DOCUMENTS

| JP | 2009-180101 | 8/2009 |
| JP | 2010-209721 | 9/2010 |
| JP | 2013-530815 | 8/2013 |
| JP | 2016-515297 | 5/2016 |
| WO | 2014/151184 | 9/2014 |

OTHER PUBLICATIONS

International Search Report dated Apr. 17, 2018 in International (PCT) Application No. PCT/JP2018/002733 with English translation.

International Preliminary Report on Patentability and Written Opinion of the International Searching Authority dated Aug. 8, 2019 in International (PCT) Application No. PCT/JP2018/002733 with English translation.

* cited by examiner

PLANT AND PLANT OPERATION METHOD

TECHNICAL FIELD

The present disclosure relates to a plant and a plant operation method.

BACKGROUND ART

Techniques have been developed to improve the output and the efficiency of a plant.

For instance, Patent Document 1 discloses a plant configured to obtain high-pressure fume by pressurizing high-temperature and low-pressure fume (combustion gas) discharged from a gas turbine, and to recover expansion energy by expanding fume after separating and recovering $CO_2$ from the high-pressure fume using an expander. Further, in the above plant, fume is intermediate-cooled by a heat exchanger disposed between a plurality of stages of compressors. As a cooling medium which exchanges heat with fume is heated by the heat exchanger, a cycle is driven where the cooling medium is a working fluid.

CITATION LIST

Patent Literature

Patent Document 1: JP2005-2996A

SUMMARY

Problems to be Solved

Meanwhile, in order to improve the output and the efficiency of a plant, it is considered desirable to effectively utilize pressure energy of high-pressure fuel gas from a pipe line, for instance.

However, Patent Document 1 does not disclose any technique to effectively utilize pressure energy of high-pressure fuel gas.

In view of the above, an object of at least one embodiment of the present invention is to provide a plant and a plant operation method whereby it is possible to improve the output and the efficiency of a plant as a whole by effectively utilizing pressure energy of high-pressure fuel gas.

Solution to the Problems (1) According to at least one embodiment of the present invention, a plant includes: a fuel supply line for supplying high-pressure fuel gas; and at least one expander disposed in the fuel supply line and configured to extract power from the high-pressure fuel gas by expanding the high-pressure fuel gas.

With the above configuration (1), the pressure of the high-pressure fuel gas is utilized and extracted as power, and thus it is possible to improve the output and the efficiency of the plant as a whole.

(2) In some embodiments, in the above configuration (1), the plant includes a heater, disposed in the fuel-supply line at an upstream side of an expander of the at least one expander, for heating the high-pressure fuel gas flowing into the expander.

With the above configuration (2), by providing the heater at the upstream side of the expander, it is possible to extract more power at the expander. Accordingly, it is possible to improve the output and the efficiency of the plant as a whole even further.

(3) In some embodiments, in the above configuration (1) or (2), the at least one expander includes a plurality of expanders disposed so as to be arranged in a flow direction of the high-pressure fuel gas, and the plant includes a plurality of heaters, each disposed in the fuel-supply line at an upstream side of corresponding one of the plurality of expanders, for heating the high-pressure fuel gas flowing into the corresponding expander.

With the above configuration (3), by providing the heater at the upstream side of each expander, it is possible to extract more power at each expander. Furthermore, it is possible to use waste heat having a relatively low temperature effectively as a heat source used for the heaters to increase the power to be recovered at the respective expanders. Accordingly, it is possible to improve the output and the efficiency of the plant as a whole even further.

(4) In some embodiments, in the above configuration (2) or (3), the plant includes a $CO_2$ rich gas line through which $CO_2$ rich gas flows; and at least one compressor, disposed in the $CO_2$ rich gas line, for pressurizing the $CO_2$ rich gas. The heater is configured to heat the high-pressure fuel gas by using waste heat of the at least one compressor.

With the above configuration (4), by pressurizing the $CO_2$ rich gas with the compressor, it is possible to use the pressurized $CO_2$ rich gas in enhanced oil recovery (EOR), or seal and fix $CO_2$ in the rock ground or under the sea. Further, by heating high-pressure fuel gas in the heater by utilizing waste heat of the compressor for pressurizing $CO_2$ rich gas, it is possible to recover more power at the expander, and improve the output and the efficiency of the plant as a whole even further.

(5) In some embodiments, in the above configuration (4), the plant is configured such that the at least one compressor includes a plurality of compressors disposed in series in the $CO_2$ rich gas line, and the heater is configured to heat the high-pressure fuel gas through heat exchange with the $CO_2$ rich gas flowing between a pair of adjacent compressors among the plurality of compressors.

With the above configuration (5), by heating high-pressure fuel gas through heat exchange with $CO_2$ rich gas flowing between a pair of compressors, it is possible to recover waste heat of the compressor to the high-pressure fuel gas and extract more power at the expander. Furthermore, $CO_2$ rich gas that is cooled through heat exchange with the high-pressure fuel gas in the heater flows into the compressor positioned downstream of the heater in the $CO_2$ rich gas line. Thus, the heater functions as an intermediate cooler of the compressor, and it is possible to cut power required to operate the compressor.

(6) In some embodiments, in the above configuration (5), the at least one compressor includes: a plurality of upstream compressors disposed in the $CO_2$ rich gas line with the heater interposed between a pair of adjacent compressors; and at least one downstream compressor disposed in the $CO_2$ rich gas line at a downstream side of the upstream compressors. The plant further includes a heat exchanger disposed in the $CO_2$ rich gas line between the downstream compressor and a most downstream compressor of the plurality of upstream compressors, or between a pair of the downstream compressors, the heat exchanger being configured to cool the $CO_2$ rich gas by using a cooling medium other than the high-pressure fuel gas.

The $CO_2$ rich gas tends to have a greater isobaric specific heat Cp near the critical pressure. Thus, when cooling $CO_2$ rich gas having a pressure level equivalent to the critical pressure through heat exchange with the high-pressure fuel gas, it is difficult to ensure balance between the temperature decrease amount of $CO_2$ rich gas and the temperature increase amount of high-pressure fuel gas.

In this regard, with the above configuration (6), by cooling $CO_2$ rich gas that is pressurized by the upstream compressor through heat exchange with a cooling medium other than high-pressure fuel gas, it is possible to cool inlet gas of the downstream compressor appropriately, and reduce compression power at the downstream compressor.

(7) In some embodiments, in any one of the above configurations (4) to (6), the plant includes a $CO_2$ separation device, disposed in the $CO_2$ rich gas line at a downstream side of the at least one compressor, for separating $CO_2$ from the $CO_2$ rich gas pressurized by the at least one compressor.

With the above configuration (7), by separating $CO_2$ from $CO_2$ rich gas using the $CO_2$ separation device, it is possible to obtain $CO_2$ with a high purity. Further, in a case where the $CO_2$ rich gas contains combustible gas as an impurity substance, it is possible to utilize the impurity gas obtained by the $CO_2$ separation device as a fuel, which may contribute to improvement of the energy efficiency of a plant as a whole.

(8) In some embodiments, in any one of the above configurations (4) to (7), the plant includes a fuel cell which includes an anode, a cathode supplied with exhaust gas containing carbon dioxide, and an electrolyte configured to transfer carbonate ion derived from the carbon dioxide contained in the exhaust gas from the cathode to the anode. The at least one compressor is configured to compress the $CO_2$ rich gas derived from an outlet gas of the anode. The anode of the fuel cell is configured to be supplied with the high-pressure fuel gas from which power has been recovered by the at least one expander.

With the above configuration (8), it is possible to recover $CO_2$ while generating power with the fuel cell, and thus it is possible to suppress reduction of the energy efficiency of a plant as a whole upon $CO_2$ recovery. Furthermore, by compressing the $CO_2$ rich gas, it is possible to utilize at least the carbon dioxide recovered with the fuel cell in EOR, or solidify the same in the rock ground or under the sea. Furthermore, while the supply pressure of fuel gas to the anode of the fuel cell does not need to be so high, it is possible to improve the energy efficiency of the plant as a whole by recovering the pressure of high-pressure fuel gas supplied to the anode as power at the expander.

(9) In some embodiments, in any one of the above configurations (4) to (8), the at least one compressor is configured to be driven by using the power extracted by the at least one expander.

With the above configuration (9), by driving the compressor by using power recovered from high-pressure fuel gas using the expander, it is possible to improve the energy efficiency of the plant as a whole.

Furthermore, power may be transmitted from the rotational shaft of the expander to the rotational shaft of the compressor via a power transmission mechanism. Alternatively, the electric motor coupled to the rotational shaft of the compressor may be driven by electric power generated by the generator coupled to the rotational shaft of the expander.

(10) According to at least one embodiment of the present invention, a method for operating a plant includes: a step of supplying high-pressure fuel gas via a fuel-supply line; and a step of extracting power from the high-pressure fuel gas by expanding the high-pressure fuel gas by using at least one expander disposed in the fuel-supply line.

According to the above method (10), the pressure of the high-pressure fuel gas is utilized and extracted as power, and thus it is possible to improve the output and the efficiency of the plant as a whole.

(11) In some embodiments, the above method (10) includes a step of heating the high-pressure fuel gas flowing into the expander by using a heater disposed in the fuel-supply line at an upstream side of an expander of the at least one expander.

According to the above method (11), the heater provided at the upstream side of the expander is used to heat the high-pressure fuel gas flowing into the expander, and thereby it is possible to extract more power at the expander. Accordingly, it is possible to improve the output and the efficiency of the plant as a whole even further.

(12) In some embodiments, the above method (11) further includes a step of pressurizing the $CO_2$ rich gas by using at least one compressor disposed in a $CO_2$ rich gas line through which $CO_2$ rich gas flows. The step of heating the high-pressure fuel gas includes heating the high-pressure fuel gas using waste heat of the at least one compressor.

According to the above method (12), by pressurizing the $CO_2$ rich gas with the compressor, it is possible to use the pressurized $CO_2$ rich gas in enhanced oil recovery (EOR), or seal and fix $CO_2$ in the rock ground or under the sea. Further, by heating high-pressure fuel gas in the heater by utilizing waste heat of the compressor for pressurizing $CO_2$ rich gas, it is possible to recover more power at the expander, and improve the output and efficiency of the plant as a whole even further.

(13) In some embodiments, in the above method (12), the at least one compressor includes a plurality of compressors disposed in series in the $CO_2$ rich gas line, and the step of heating the high-pressure fuel gas includes heating the high-pressure fuel gas through heat exchange with the $CO_2$ rich gas flowing between a pair of adjacent compressors of the plurality of compressors.

According to the above method (13), by heating high-pressure fuel gas through heat exchange with $CO_2$ rich gas which flows between a pair of compressors, it is possible to recover waste heat of the compressor to the high-pressure fuel gas and extract more power at the expander. Furthermore, $CO_2$ rich gas that is cooled through heat exchange with the high-pressure fuel gas in the heater flows into the compressor positioned downstream of the heater in the $CO_2$ rich gas line. Thus, the heater functions as an intermediate cooler of the compressor, and it is possible to cut power required to operate the compressor.

(14) In some embodiments, in the above method (13), the at least one compressor includes: a plurality of upstream compressors disposed in the $CO_2$ rich gas line with the heater interposed between a pair of adjacent compressors; and at least one downstream compressor disposed in the $CO_2$ rich gas line at a downstream side of the upstream compressors. The method further includes a step of cooling the $CO_2$ rich gas by using a cooling medium other than the high-pressure fuel gas at a heat exchanger disposed between the downstream compressor and a most downstream compressor of the plurality of upstream compressors, or between a pair of the downstream compressors in the $CO_2$ rich gas line.

The $CO_2$ rich gas tends to have a greater isobaric specific heat Cp near the critical pressure. Thus, when cooling $CO_2$ rich gas having a pressure level equivalent to the critical pressure through heat exchange with the high-pressure fuel gas, it is difficult to ensure balance between the temperature decrease amount of $CO_2$ rich gas and the temperature increase amount of high-pressure fuel gas.

In this regard, according to the above method (14), by cooling $CO_2$ rich gas pressurized by the upstream compressor through heat exchange with a cooling medium other than high-pressure fuel gas, it is possible to cool inlet gas of the upstream compressor appropriately, and reduce compression power at the upstream compressor.

(15) In some embodiments, any one of the above methods (12) to (14) includes a step of separating $CO_2$ from the $CO_2$ rich gas pressurized by the at least one compressor by using a $CO_2$ separation device disposed in the $CO_2$ rich gas line at a downstream side of the at least one compressor.

According to the above method (15), by separating $CO_2$ from $CO_2$ rich gas using the $CO_2$ separation device, it is possible to obtain $CO_2$ with a high purity. Further, in a case where the $CO_2$ rich gas contains combustible gas as an impurity substance, it is possible to utilize the impurity gas obtained by the $CO_2$ separation device as a fuel, which may contribute to improvement of the energy efficiency of a plant as a whole.

(16) In some embodiments, any one of the above methods (12) to (15) further includes: a step of supplying at least a part of exhaust gas containing carbon dioxide to a cathode of a fuel cell; a step of transferring carbonate ion derived from the carbon dioxide contained in the exhaust gas from the cathode to an anode of the fuel cell through an electrolyte of the fuel cell; and a step of supplying the anode of the fuel cell with the high-pressure fuel gas from which power has been recovered by the at least one expander. The step of pressurizing the $CO_2$ rich gas includes compressing the $CO_2$ rich gas derived from an outlet gas of the anode by using the at least one compressor.

According to the above method (16), it is possible to recover $CO_2$ while generating power with the fuel cell, and thus it is possible to suppress reduction of the energy efficiency of a plant as a whole upon $CO_2$ recovery. Furthermore, by compressing the $CO_2$ rich gas, it is possible to utilize at least the carbon dioxide recovered with the fuel cell in EOR, or solidify the same in the rock ground or under the sea. Furthermore, while the supply pressure of fuel gas to the anode of the fuel cell does not need to be so high, it is possible to improve the energy efficiency of the plant as a whole by recovering the pressure of high-pressure fuel gas supplied to the anode as power at the expander.

Advantageous Effects

According to at least one embodiment of the present invention, it is possible to provide a plant and a plant operation method whereby it is possible to improve the output and the efficiency of a plant as a whole by effectively utilizing pressure energy of high-pressure fuel gas.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

FIGS. 1 to 7, 10, and 11 are each a schematic configuration diagram of a plant according to an embodiment. As depicted in FIGS. 1 to 7, 10, and 11, a plant 1 according to some embodiments includes a fuel supply line 2 for supplying high-pressure fuel gas and at least one expander 4 disposed in the fuel supply line 2. The fuel supply line 2 includes an upstream fuel supply line 2a positioned upstream of the at least one expander 4 and a downstream fuel supply line 2b positioned downstream of the at least one expander 4. The expander 4 is configured to expand high-pressure fuel gas that flows in from the upstream fuel supply line 2a and extract power from the high-pressure fuel gas.

Figure 10:
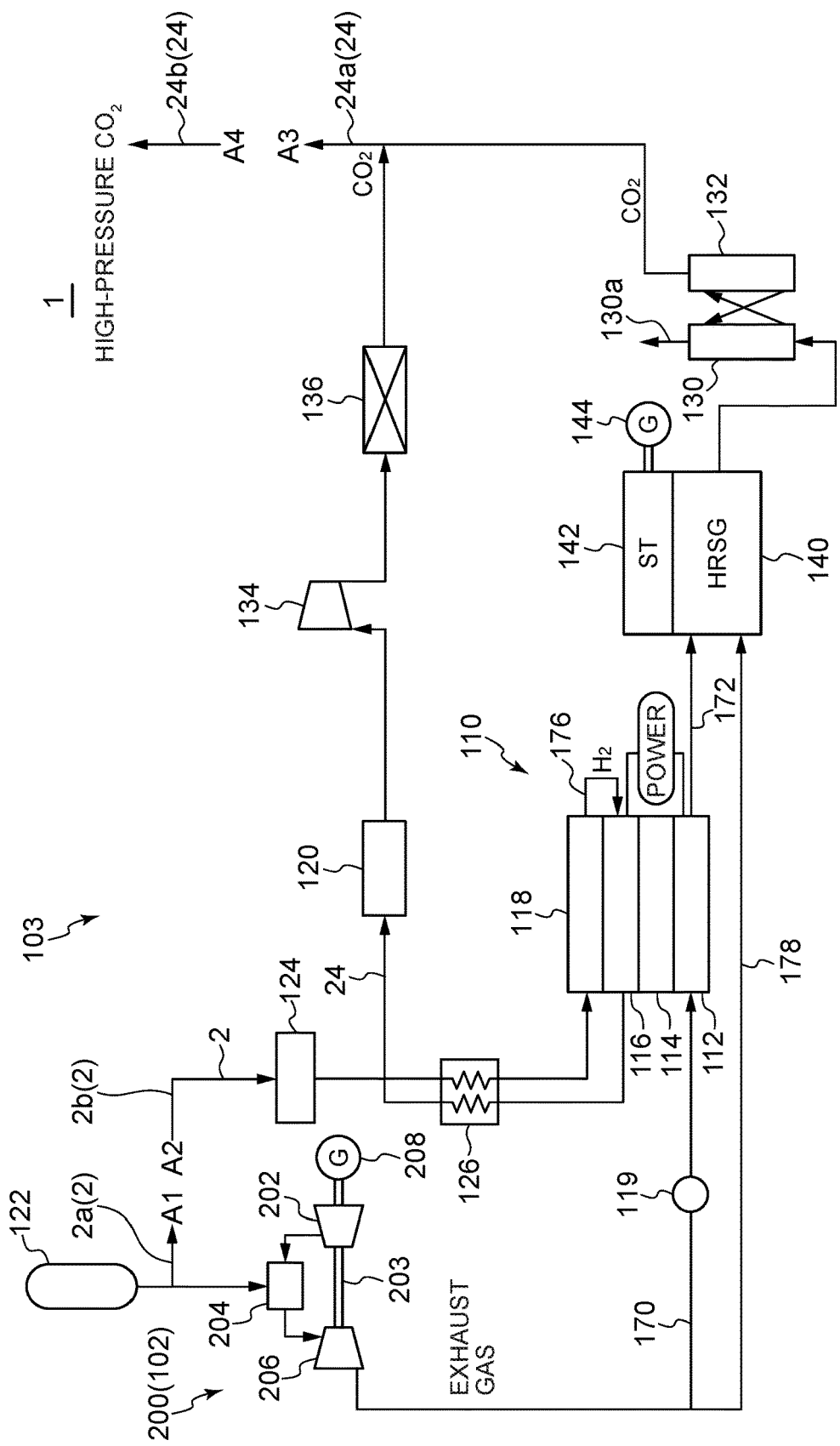
FIG. 10 is a schematic configuration diagram of a plant according to an embodiment.
Figure 11:
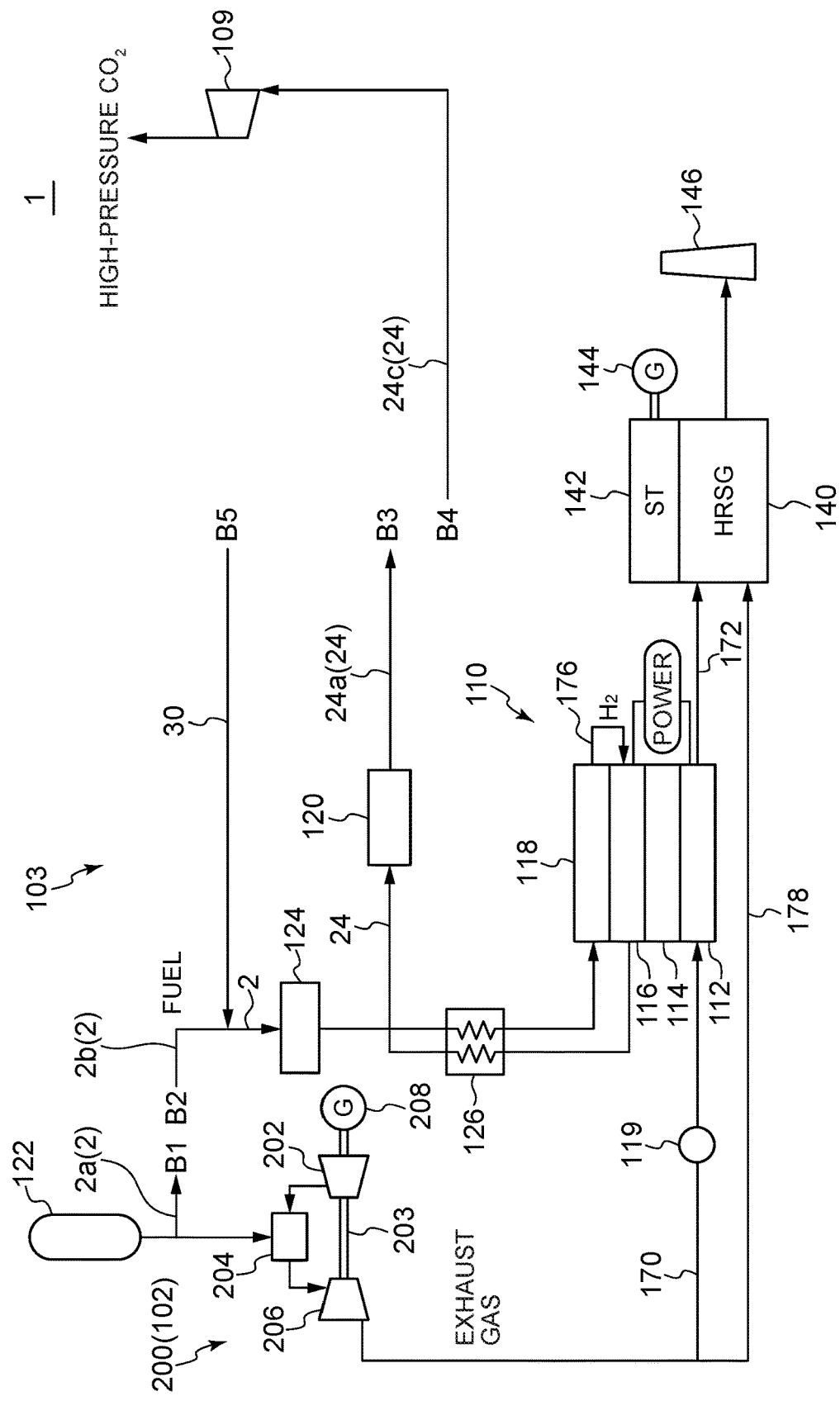
FIG. 11 is a schematic configuration diagram of a plant according to an embodiment.

In FIGS. 10 and 11, the plant 1 includes a thermal power generation device 102 including a gas turbine 200, and a $CO_2$ recovery system 103 configured to recover carbon dioxide ($CO_2$) contained in exhaust gas from the thermal power generation device 102. In FIGS. 10 and 11, the expander 4 is not depicted. The configurations of the thermal power generation device 102 and the $CO_2$ recovery system 103 will be described later.

The high-pressure fuel gas is a fuel gas having a higher pressure than normal pressure, and may have a pressure of approximately 1 MPa to 20 MPa at the inlet of the expander 4 (in a case where the at least one expander 4 includes a plurality of expanders 4, the inlet of the most upstream expander 4). For instance, the fuel gas may be a natural gas, or a syngas containing CO or Hz, for instance, obtained by processing coal or biomass in a gasifier.

Figure 2:
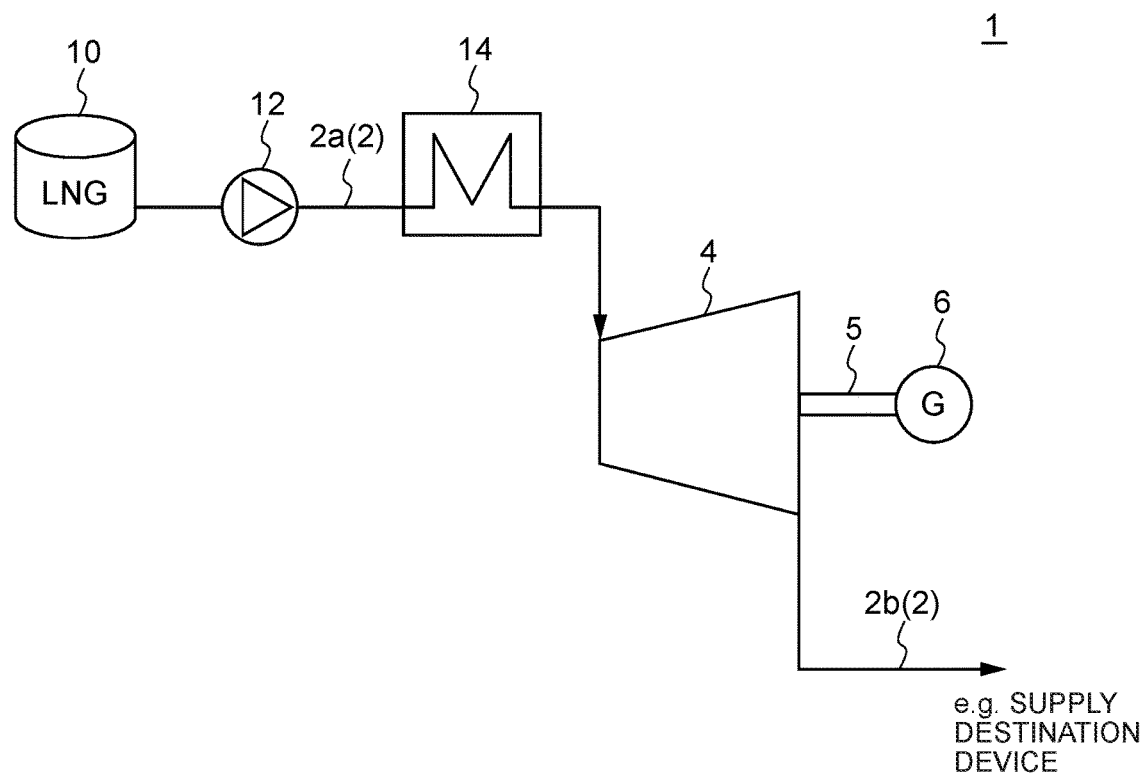
FIG. 2 is a schematic configuration diagram of a plant according to an embodiment.

For instance, in an illustrative embodiment depicted in FIG. 2, a fuel tank 10 is connected to the upstream fuel supply line 2a, and a pump 12 and a heat exchanger 14 are disposed in the upstream fuel supply line 2a. Further, the liquefied natural gas stored in the fuel tank 10 is gasified by the heat exchanger 14 after being pressurized by the pump 12, and then flows into the expander 4 as a high-pressure fuel gas. The heat exchanger 14 may be configured to gasify a liquefied natural gas through heat exchange with a heat source such as air and sea water.

Figure 3:
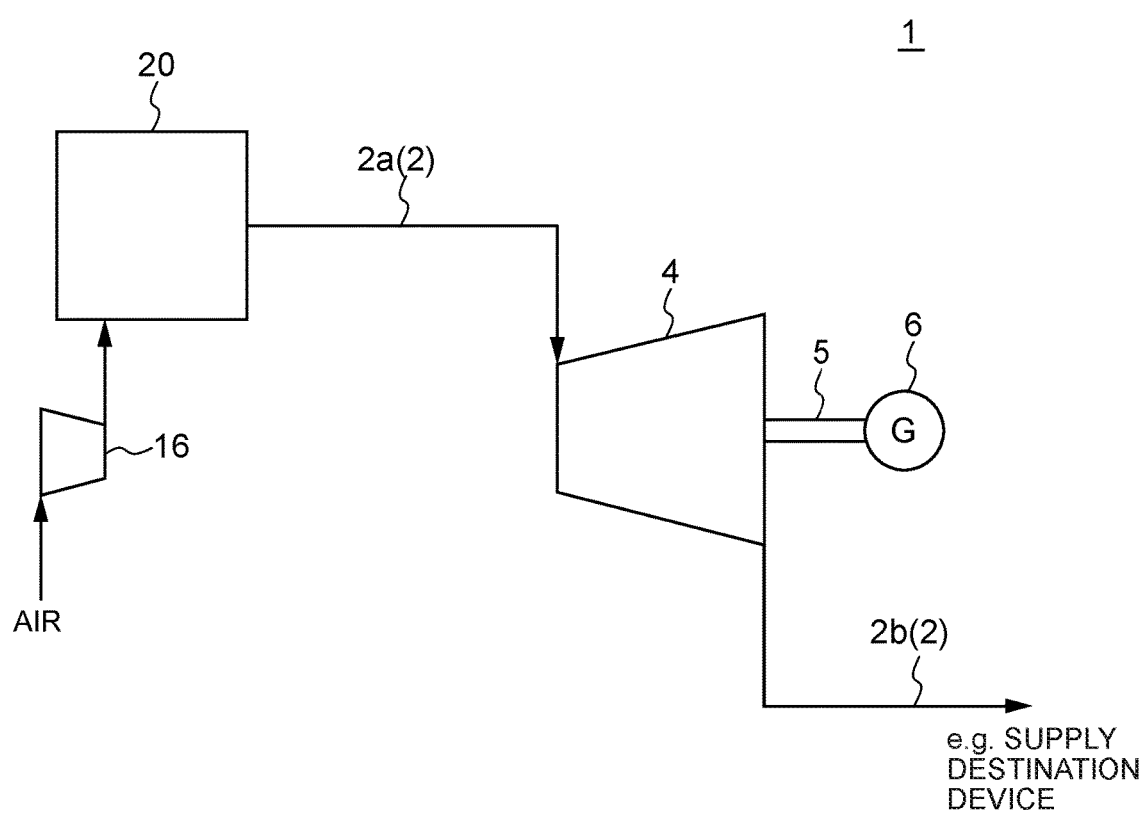
FIG. 3 is a schematic configuration diagram of a plant according to an embodiment.

Further, for instance, in an illustrative embodiment depicted in FIG. 3, the upstream fuel supply line 2a is connected to a gas discharge port of a gasification furnace 20 for gasification processing of coal or biomass, for instance. Further, a syngas obtained by processing coal or biomass, for instance, in the gasification furnace 20 flows into the expander 4 as a high-pressure fuel gas.

Further, the gasification furnace 20 may be supplied with air for combusting coal or biomass, for instance. The air may be supplied to the gasification furnace 20 after being compressed by the compressor 16, as depicted in FIG. 3. The compressor 16 may be driven by an electric motor, or driven by a turbine. The turbine that drives the compressor 16 may be the above described expander 4.

The expander 4 may be a turbine (rotary-type expander) configured to extract expansion work of a gas as rotational motion, or a reciprocation-type expander configured to extract expansion work of a gas as reciprocal motion.

Further, in the illustrative embodiment depicted in FIGS. 1 to 7, a turbine configured to be rotary-driven by gas that flows in is used as the expander 4. Further, as depicted in FIGS. 1 to 7, the generator 6 may be connected to the rotational shaft 5 of the turbine (expander 4), and the generator 6 may be configured to generate electric power by being rotary-driven by the turbine.

Figure 6:
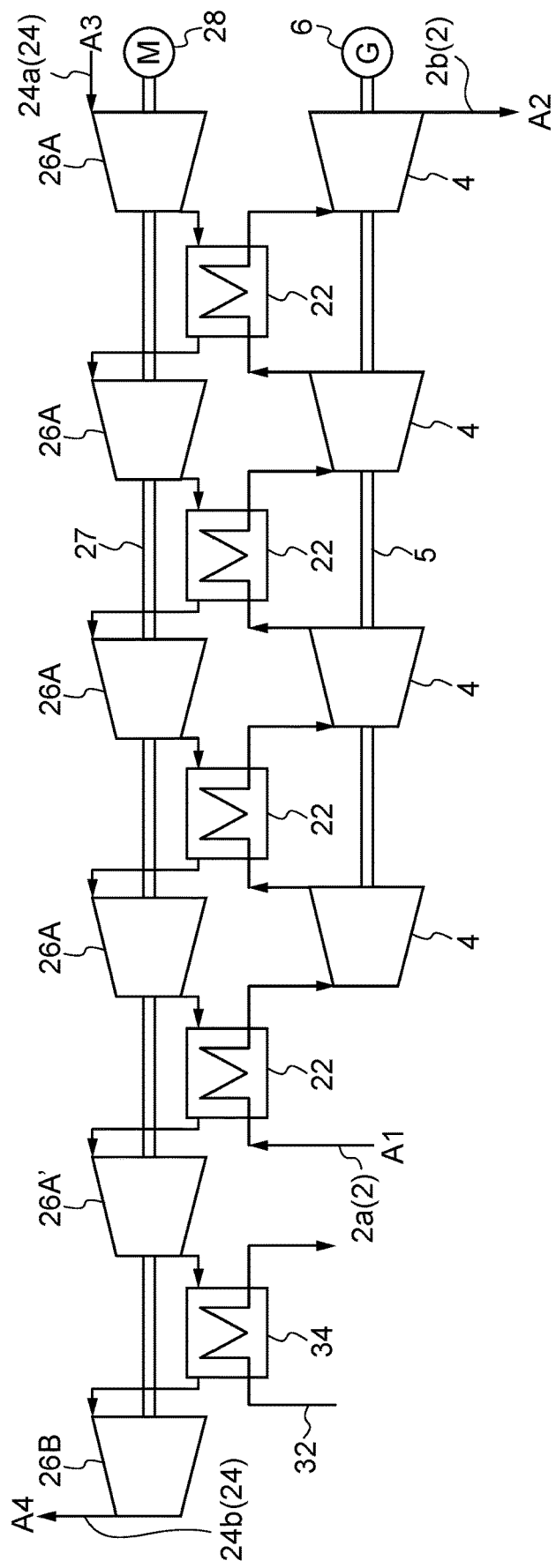
FIG. 6 is a schematic configuration diagram of a plant according to an embodiment.
Figure 7:
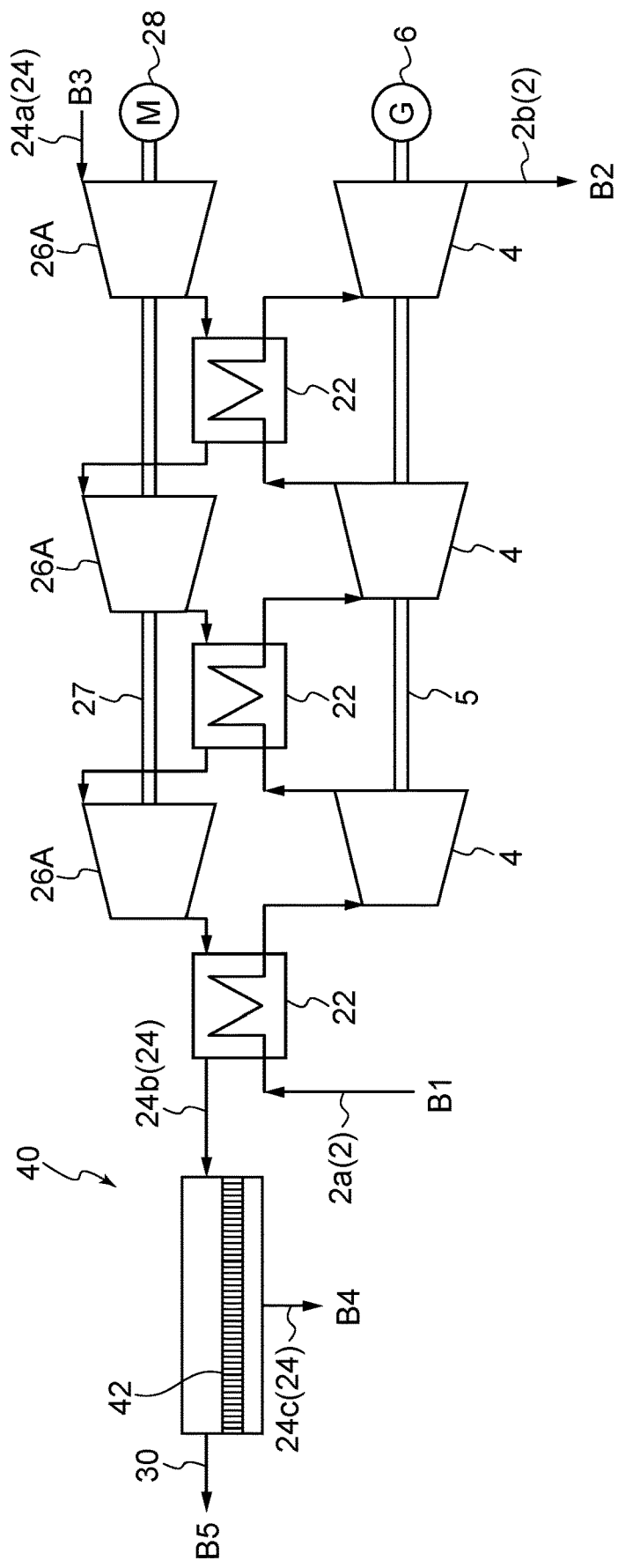
FIG. 7 is a schematic configuration diagram of a plant according to an embodiment.

Further, as depicted in FIGS. 6 and 7, a plurality of expanders 4 may be disposed in series in the fuel supply line 2. The plurality of expanders 4 may be disposed coaxially and configured such that each expander 4 rotary drives a common generator 6.

Fuel gas from which power has been extracted by the expander 4 and whose pressure has decreased is discharged from the expander 4, and then is supplied to a device or the like that uses the fuel gas via the downstream fuel supply line 2b. The pressure of fuel gas at the outlet of the expander 4 (in a case where the at least one expander 4 includes a plurality of expanders 4, the outlet of the most downstream expander 4) may be, for instance, a pressure of approximately 5% to 30% of the pressure of the fuel gas at the inlet of the expander 4 (high-pressure fuel gas), for instance. Alternatively, the pressure of fuel gas at the outlet of the expander 4 may be approximately 0.2 MPa to 1.5 MPa, for instance.

The fuel gas may be supplied to a fuel cell (various fuel cells such as MCFC, SOFC, PEFC, PAFC, etc.), a boiler, or a micro gas turbine or the like as a fuel, or, may be supplied to houses or various facilities as city gas.

As described above, in the plant 1 according to some embodiments, by using the expander 4 disposed in the fuel supply line 2 to effectively use the pressure of the high-pressure fuel gas and extract the pressure as power, it is possible to improve the output and the efficiency of the plant as a whole.

In some embodiments, the plant 1 includes a heater 22 disposed in the fuel supply line 2 at the upstream side of one of the at least one expander 4. The heater 22 is configured to heat high-pressure fuel gas that flows into the above expander 4 (i.e. the expander 4 positioned downstream of the heater 22 in the fuel supply line 2).

Figure 4:
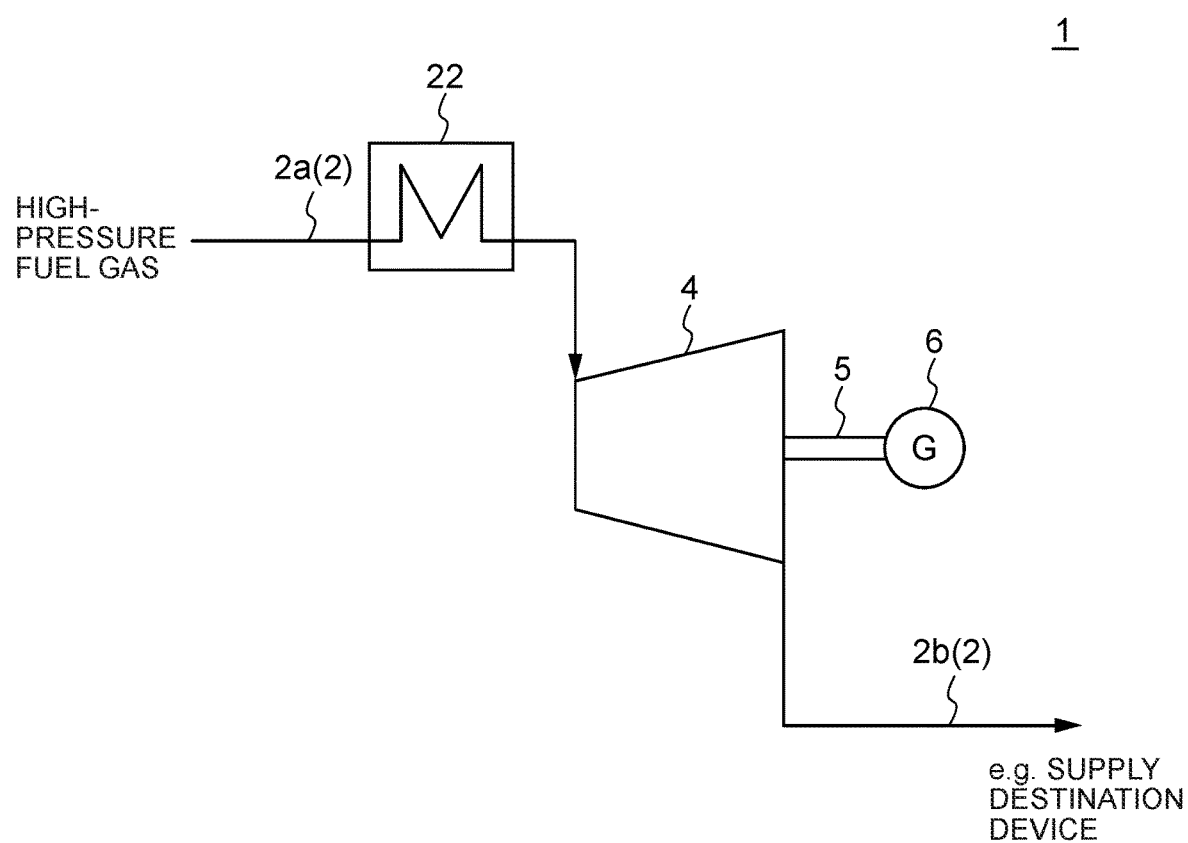
FIG. 4 is a schematic configuration diagram of a plant according to an embodiment.

For instance, in an illustrative embodiment depicted in FIG. 4, one expander 4 is disposed in the fuel supply line 2, and the heater 22 is disposed in the fuel supply line at the upstream side of the expander 4.

Figure 5:
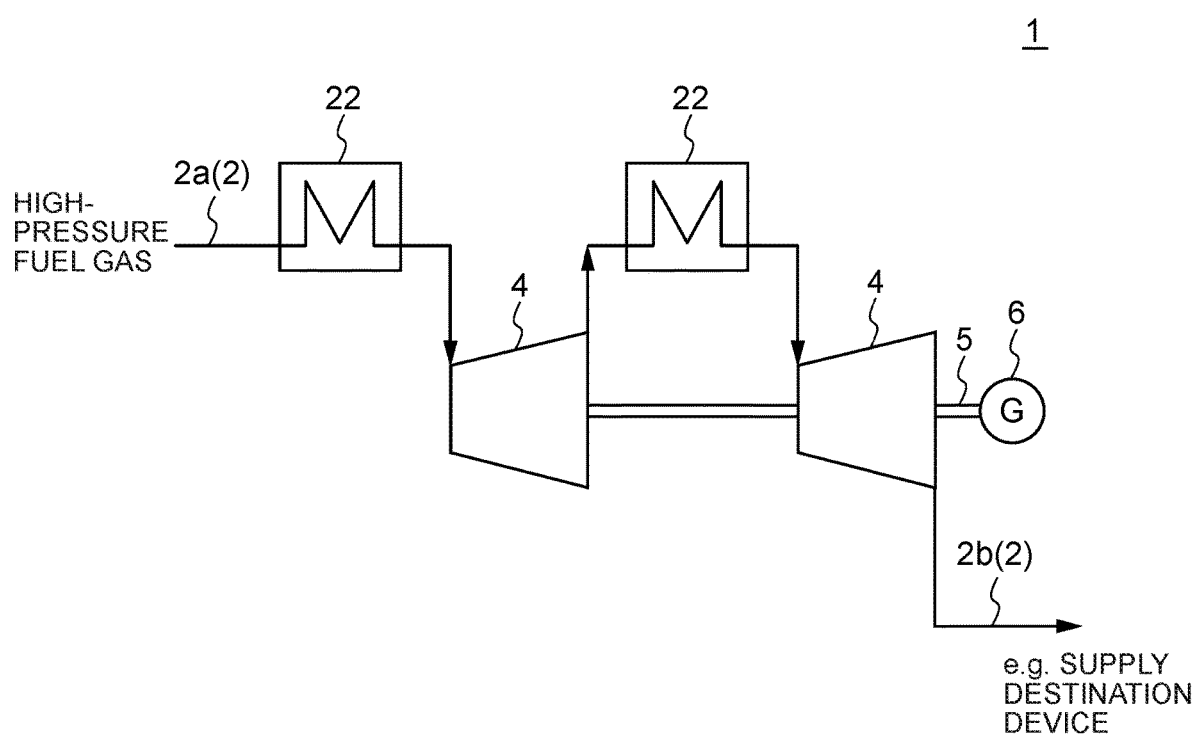
FIG. 5 is a schematic configuration diagram of a plant according to an embodiment.

Further, for instance, in the illustrative embodiment depicted in FIGS. 5 to 7, a plurality of expanders 4 are disposed in the fuel supply line 2, arranged in the flow direction of the high-pressure fuel gas. Further, in the fuel supply line 2, a plurality of heaters 22 corresponding to the respective expanders 4 are disposed at the upstream side of the respective expanders 4.

As described above, by providing the heater 22 at the upstream side of the expander 4, it is possible to extract more power at the expander 4. Accordingly, it is possible to improve the output and the efficiency of the plant as a whole even further.

Furthermore, as depicted in FIGS. 5 to 7, by providing the plurality of heaters 22 upstream of the respective expanders 4, it is possible to extract more power per expander 4. Furthermore, by providing a plurality of heaters 22 corresponding to the respective expanders 4, it is possible to use waste heat having a relatively low temperature effectively as a heat source for the heaters 22 to increase the power to be recovered at the respective expanders 4. Accordingly, it is possible to improve the output and the efficiency of the plant as a whole even further.

In some embodiments, as depicted in FIGS. 6, 7, 10, and 11, the plant 1 includes a $CO_2$ rich gas line 24 through which $CO_2$ rich gas flows, and at least one compressor 26A and/or 26B (hereinafter, referred to as compressor (26A, 26B)) disposed in the $CO_2$ rich gas line 24. The $CO_2$ rich gas line 24 includes an upstream $CO_2$ rich gas line 24a positioned upstream of the at least one compressor (26A, 26B), and a downstream $CO_2$ rich gas line 24b positioned downstream of the at least one compressor (26A, 26B). The compressor (26A, 26B) is configured to increase the pressure of $CO_2$ rich gas that flows through the $CO_2$ rich gas line 24. Further, the heater 22 is configured to heat high-pressure fuel gas flowing through the fuel supply line 2 with waste heat of the compressor (26A, 26B). That is, at the heater 22, high-pressure fuel gas flowing through the fuel supply line 2 is heated, through heat exchange with $CO_2$ rich gas that has its pressure increased through compression at the compressor (26A, 26B) positioned upstream of the heater 22 in the $CO_2$ rich gas line 24.

In FIGS. 10 and 11, the compressor (26A, 26B) is not depicted.

The compressor (26A, 26B) may be driven by an electric motor 28 connected via a rotational shaft 27.

In the illustrative embodiments depicted in FIGS. 6 and 7, a plurality of compressors (26A, 26B) are disposed in series in the $CO_2$ rich gas line. As depicted in FIGS. 6 and 7, a plurality of compressors (26A, 26B) may be disposed coaxially, and the respective compressors (26A, 26B) may be driven by a common electric motor 28.

$CO_2$ rich gas that flows through the $CO_2$ rich gas line may be a gas that has a higher $CO_2$ concentration than high-pressure fuel gas that flows through the fuel supply line 2.

Alternatively, $CO_2$ rich gas that flows through the $CO_2$ rich gas line 24 may be $CO_2$ rich gas that is generated during the process of recovering $CO_2$ from exhaust gas containing $CO_2$ discharged from an exhaust gas generation facility. In this case, the $CO_2$ rich gas may be a gas that has a higher $CO_2$ concentration than the exhaust gas to be processed.

For instance, in the illustrative embodiments depicted in FIGS. 10 and 11, $CO_2$ contained in exhaust gas from the gas turbine 200 is recovered via the cathode 112 and the anode 116 of the fuel cell 110, and anode outlet gas that flows out from the anode 116 as $CO_2$ rich gas is guided to the $CO_2$ rich gas line 24.

By pressurizing the $CO_2$ rich gas with the compressor (26A, 26B) as described above, it is possible to use pressurized $CO_2$ rich gas in enhanced oil recovery (EOR), or seal and fix $CO_2$ in the rock ground or under the sea. Further, by heating high-pressure fuel gas at the heater 22 by utilizing waste heat of the compressor 26 (26A, 26B) for pressurizing $CO_2$ rich gas, it is possible to recover more power at the expander 4, and improve the output and efficiency of the plant as a whole even further.

In some embodiments, for instance, as depicted in FIGS. 6 and 7, in the $CO_2$ rich gas line 24, the heater 22 is disposed between a pair of adjacent compressors 26A among a plurality of compressors 26A disposed in series. At the heater 22, the high-pressure fuel gas flowing through the fuel supply line 2 is heated through heat exchange with $CO_2$ rich gas that flows between the above described pair of adjacent compressors 26A.

As described above, by heating high-pressure fuel gas through heat exchange with $CO_2$ rich gas which flows between a pair of compressors 26A, it is possible to recover waste heat of the compressor 26A to the high-pressure fuel gas and extract more power at the expander 4. Furthermore, $CO_2$ rich gas that is cooled through heat exchange with the high-pressure fuel gas at the heater 22 flows into the compressor 26A positioned downstream of the heater 22 in the $CO_2$ rich gas line, and thus the heater 22 functions as an intermediate cooler of the compressor 26A, which makes it possible to cut power required to operate the compressor 26A.

In some embodiments, as depicted in FIG. 6, the at least one compressor (26A, 26B) disposed in the $CO_2$ rich gas line 24 includes a plurality of compressors 26A (upstream compressors) and at least one compressor 26B (downstream compressor) positioned downstream of the plurality of compressors 26A in the $CO_2$ rich gas line 24. In the $CO_2$ rich gas line 24, a heater 22 is interposed between a pair of adjacent compressors 26A of the plurality of compressors 26A (upstream compressors). Further, in the $CO_2$ rich gas line, a heat exchanger 34 is disposed between the compressor 26B (downstream compressor) and the compressor 26A' positioned most downstream among the plurality of compressors 26A (upstream compressors), or between a pair of compressors 26B (downstream compressors). A cooling medium other than high-pressure fuel gas is guided to the heat exchanger 34 via the cooling medium line 32. The heat exchanger 34 is configured to cool $CO_2$ rich gas that flows through the $CO_2$ rich gas line 24 through heat exchange with the cooling medium.

Further, in an illustrative embodiment depicted in FIG. 6, one compressor 26B (downstream compressor) is disposed downstream of the plurality of compressors 26A (upstream compressors) in the $CO_2$ rich gas line 24. In the $CO_2$ rich gas line 24, a heat exchanger 34 is disposed between the compressor 26B and the compressor 26A' positioned most downstream of the plurality of compressors 26A.

In some embodiments, the plant 1 includes a boiler (not depicted) for generating steam, and the heat exchanger 34 may be configured such that water supplied to the boiler for generating steam is guided to the heat exchanger 34 via a cooling medium line 32 as a cooling medium.

Further, the above described boiler may be a waste-heat recovery boiler (HRSG) for recovering heat of waste gas from the gas turbine.

The $CO_2$ rich gas tends to have a greater isobaric specific heat Cp near the critical pressure of $CO_2$ (approximately 7.4 MPa). Thus, when cooling $CO_2$ rich gas having a pressure level equivalent to the critical pressure through heat exchange with the high-pressure fuel gas, it is difficult to ensure balance between the temperature decrease amount of $CO_2$ rich gas and the temperature increase amount of high-pressure fuel gas.

In this regard, as described above, by cooling $CO_2$ rich gas pressurized by the compressor 26A (upstream compressor) through heat exchange with a cooling medium other than high-pressure fuel gas, it is possible to cool inlet gas of the compressor 26B (downstream compressor) appropriately, and reduce compression power at the compressor 26B (downstream compressor).

In some embodiments, the pressure of $CO_2$ rich gas flowing through the heat exchanger 34 for exchanging heat between $CO_2$ rich gas and a cooling medium other than the high-pressure fuel gas may be equal to or higher than 90% of the critical pressure of $CO_2$.

In this case, by cooling $CO_2$ rich gas having a pressure close to the critical pressure through heat exchange with a cooling medium other than high-pressure fuel gas, it is possible to cool inlet gas of the compressor 26B (downstream compressor) having a comparatively high isobaric specific heat Cp effectively, and reduce compression power at the compressor 26B (downstream compressor).

Although not depicted, the heater 22 and/or heat exchanger 34 may be configured to be capable of separating drain water generated from condensation of moisture contained in $CO_2$ rich gas. In this way, it is possible to suppress damage due to erosion or the like of the compressor (26A, 26B) that compresses $CO_2$ rich gas.

In some embodiments, at least one compressor (26A, 26B) may be configured to be driven by using power extracted by the at least one expander 4.

As described above, by driving the compressor (26A, 26B) by using power recovered from high-pressure fuel gas using the expander 4, it is possible to improve the energy efficiency of the plant as a whole.

For instance, in an embodiment, the rotational shaft 27 (see FIG. 6 or FIG. 7) of the compressor (26A, 26B) and the rotational shaft 5 of the expander 4 (see FIG. 6 or FIG. 7) may be connected via a power transmission mechanism (e.g. gear; not depicted). Further, the compressor (26A, 26B) may be driven at least partially through transmission of power from the rotational shaft 5 of the expander 4 to the rotational shaft 27 (see FIG. 6 or FIG. 7) of the compressor (26A, 26B) via the power transmission mechanism.

In this case, the amount of power for driving the compressor (26A, 26B) may be, for instance, adjusted by a generator 6 coupled to the rotational shaft 5 of the expander 4, or an electric motor 28 connected to the rotational shaft 27 of the compressor (26A, 26B).

Further, for instance, in an embodiment, the electric motor 28 coupled to the rotational shaft 27 of the compressor (26A, 26B) may be driven by electric power generated by the generator 6 coupled to the rotational shaft 5 of the expander 4.

In this case, the electric motor 28 and the generator 6 may be connected to each other via an electric cable (not depicted), and the electric motor 28 and the generator 6 may be connected to a utility grid via the electric cable. Further, the amount of electric power for driving the compressor (26A, 26B) may be adjusted through power supply to the utility grid and power input from the utility grid.

In FIGS. 6 and 7, a plurality of expanders 4 are coupled coaxially and directly via the rotational shaft 5, and a plurality of compressors (26A, 26B) are coupled coaxially and directly via the rotational shaft 27, and thereby power is transmitted between the plurality of expanders 4 and the plurality of compressors (26A, 26B). Nevertheless, the power transmission between the plurality of expanders 4 and the plurality of compressors (26A, 26B) is not limited to this.

For instance, the plurality of expanders 4 and/or the plurality of compressors (26A, 12B) may have respective rotational shafts connected via a power transmission mechanism such as a gear. Furthermore, a generator and/or an electric motor corresponding to each of the plurality of expanders 4 and/or the plurality of compressors (26A, 12B) may be provided, and each electric motor may drive the plurality of compressors (26A, 26B). The above electric motors may be supplied with electric power generated by a generator driven by the expander 4.

In some embodiments, as depicted in FIG. 7, the plant 1 includes a $CO_2$ separation device 40 disposed in the $CO_2$ rich gas line 24 at a downstream side of the compressor (26A, 27B). The $CO_2$ separation device 40 is configured to separate $CO_2$ from $CO_2$ rich gas pressurized by the compressor (26A, 26B).

By separating $CO_2$ from $CO_2$ rich gas using the $CO_2$ separation device 40, it is possible to obtain $CO_2$ with a high purity. Further, in a case where the $CO_2$ rich gas contains combustible gas (e.g. H2 or CO) as an impurity substance, it is possible to utilize the impurity gas obtained by the $CO_2$ separation device 40 as a fuel, which may contribute to improvement of the energy efficiency of a plant as a whole.

Figure 8:
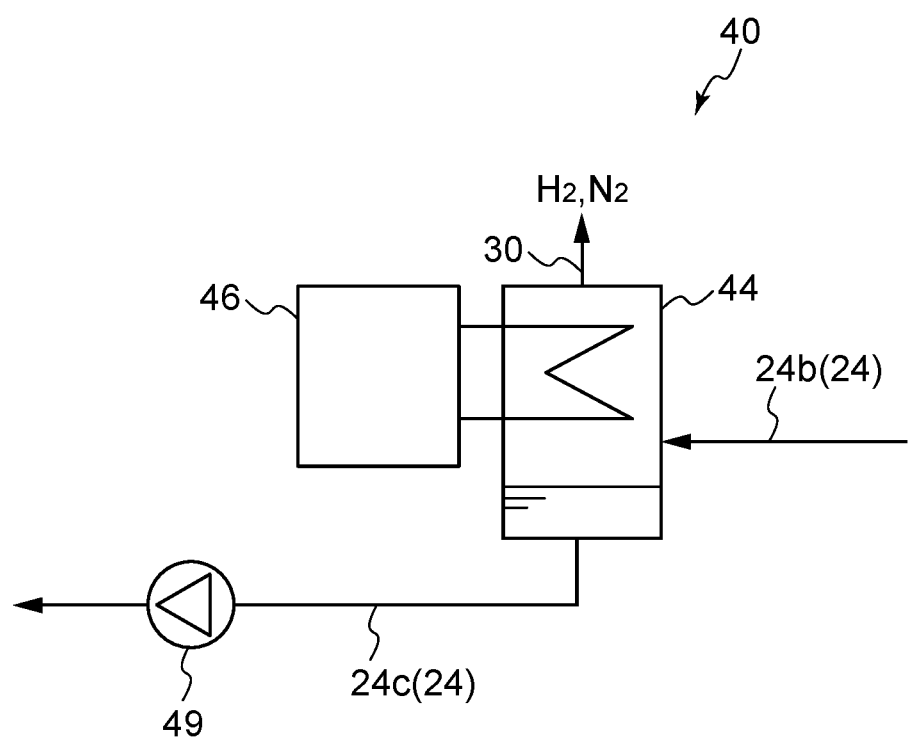
FIG. 8 is a schematic configuration diagram of a $CO_2$ separation device according to an embodiment.
Figure 9:
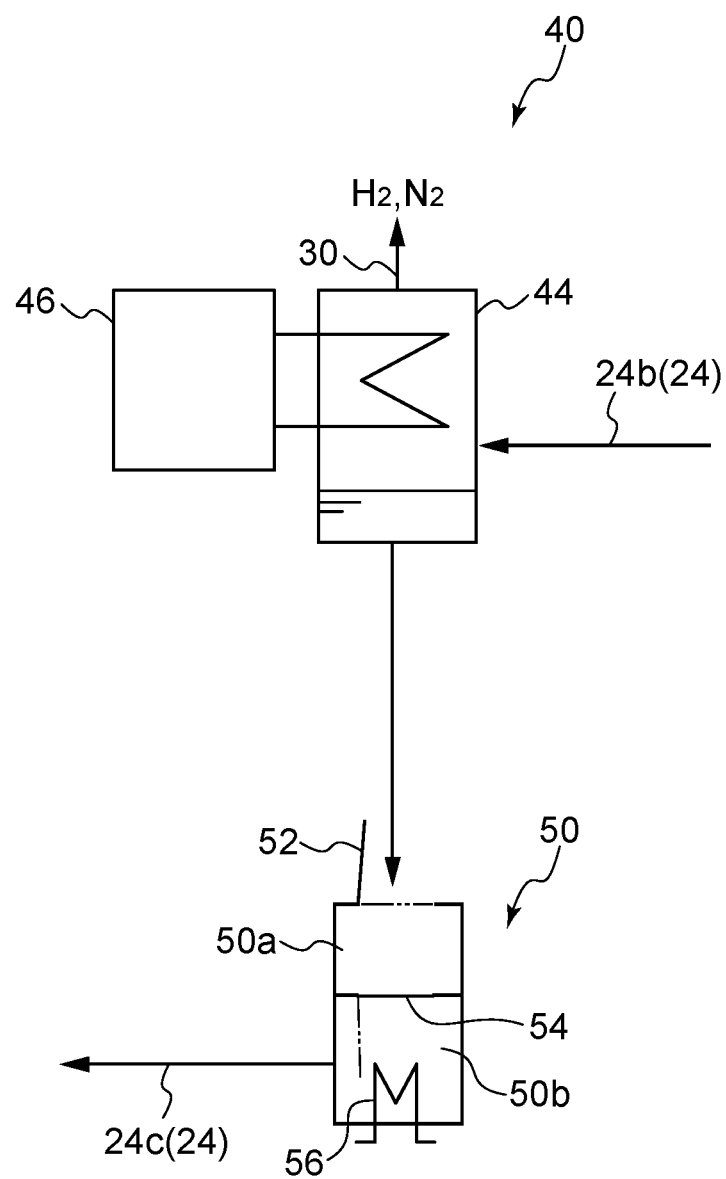
FIG. 9 is a schematic configuration diagram of a $CO_2$ separation device according to an embodiment.

Herein, FIGS. 8 and 9 are each a schematic configuration diagram of a $CO_2$ separation device according to another embodiment.

In the illustrative embodiment depicted in FIGS. 7 to 9, $CO_2$ rich gas pressurized by the compressor (26A, 26B) is guided to the $CO_2$ separation device 40 via the downstream $CO_2$ rich gas line 24b. Further, $CO_2$ separated from the $CO_2$ rich gas is discharged from the $CO_2$ separation device 40 via the $CO_2$ recovery line 24c of the $CO_2$ rich gas line 24. Further, the remaining impurity gas obtained by excluding $CO_2$ from the $CO_2$ rich gas is discharged from the $CO_2$ separation device 40 via the discharge line 30. The impurity gas may contain $H_2$, CO, or $N_2$, for instance.

In some embodiments, as depicted in FIG. 7 for instance, the $CO_2$ separation device 40 includes a $CO_2$ separation membrane 42 configured to separate $CO_2$ from the above described $CO_2$ rich gas.

In the illustrative embodiment depicted in FIG. 7, the $CO_2$ separation membrane 42 is configured to selectively let $CO_2$ permeate and separate from $CO_2$ rich gas containing $CO_2$ and components other than $CO_2$ (e.g. $H_2$ or $N_2$) by utilizing the pressure difference across the $CO_2$ separation membrane 42 (e.g. $CO_2$ partial pressure difference). The $CO_2$ rich gas compressed by the compressor (26A, 26B) has a high pressure and thus it is possible to separate $CO_2$ effectively from $CO_2$ rich gas by using the $CO_2$ separation membrane 42.

At the $CO_2$ separation device 40, $CO_2$ having been separated from the $CO_2$ rich gas and permeated the $CO_2$ separation membrane 42 is discharged from the $CO_2$ separation device 40 via the $CO_2$ recovery line 24c, and the remaining impurity gas that does not permeate the $CO_2$ separation membrane 42 is discharged from the $CO_2$ separation device 40 via the discharge line 30.

Further, in some embodiments, as depicted in FIGS. 8 and 9 for instance, the $CO_2$ separation device 40 includes a $CO_2$ liquefaction/solidification device 44 configured to separate $CO_2$ from the above described $CO_2$ rich gas. The $CO_2$ liquefaction/solidification device 44 is configured to cool $CO_2$ rich gas through heat exchange with a cooling medium from a freezer 46. Further, after $CO_2$ contained in the $CO_2$ rich gas is cooled to be liquefied or solidified, the $CO_2$ is discharged from the $CO_2$ separation device 40 via the $CO_2$ recovery line 24c. Meanwhile, of the components contained in the $CO_2$ rich gas, impurity components (e.g. $H_2$ or CO) that have a lower solidification point or boiling point than $CO_2$ is discharged from the $CO_2$ separation device 40 via the discharge line 30 while remaining in the gas state.

In the illustrative embodiment depicted in FIG. 8, the $CO_2$ liquefaction/solidification device 44 is configured to cool and liquefy $CO_2$ contained in $CO_2$ rich gas. The liquefied $CO_2$ having a high purity (liquefied $CO_2$) is discharged from the $CO_2$ separation device 40 via the $CO_2$ recovery line 24c.

A pump 49 for pressurizing the liquefied $CO_2$ may be disposed in the $CO_2$ recovery line 24c. By pressurizing the liquefied $CO_2$ with the pump 49, it is possible to obtain $CO_2$ having a high purity and a high pressure.

In the illustrative embodiment depicted in FIG. 9, the $CO_2$ liquefaction/solidification device 44 is configured to cool and solidify $CO_2$ contained in $CO_2$ rich gas. The solidified $CO_2$ having a high purity (solid $CO_2$) is extracted to the first chamber 50a of the gasifier 50 and then transferred to the second chamber 50b, where the $CO_2$ receives heat from the heat source 56 and is gasified and pressurized. The gasified and pressurized $CO_2$ having a high purity is discharged from the $CO_2$ separation device via the $CO_2$ recovery line 24c.

As depicted in FIG. 9, the gasifier 50 may include a lid part 52 for receiving the solid $CO_2$ generated in the $CO_2$ liquefaction/solidification device 44 to the first chamber 50a, and a lid part 54 for switching the communication state between the first chamber 50a and the second chamber 50b. The lid parts 52, 54 may be configured to open and close appropriately when taking out solid $CO_2$ from the $CO_2$ liquefaction/solidification device 44 to the first chamber 50a, and when transferring solid $CO_2$ from the first chamber 50a to the second chamber 50b. Further, in FIG. 9, the lid part 52 is open and the lid part 54 is closed to take out the solid $CO_2$ from the $CO_2$ liquefaction/solidification device 44 to the first chamber 50a.

In some embodiments, the $CO_2$ liquefaction/solidification device 44 may be configured to cool the $CO_2$ rich gas to liquefy a part of $CO_2$ contained in the $CO_2$ rich gas and solidify another part of $CO_2$. In this case, the liquefied $CO_2$ and the solidified $CO_2$ may be recovered through different recovery lines.

The plant 1 (e.g. see FIGS. 6 to 9) including the above described expander 4 and compressor (26A, 26B) may be applied to a plant including the fuel cell 110 as depicted in FIG. 10 or 11, for instance.

The plant 1 depicted in FIGS. 10 and 11 includes a fuel cell 110 that includes a cathode 112, an anode 116, and an electrolyte 114 disposed between the cathode 112 and the anode 116. The cathode 112 of the fuel cell 110 is supplied with exhaust gas containing $CO_2$. Further, the electrolyte 114 is configured to transfer carbonate ion ($CO_3^{2-}$) derived from $CO_2$ contained in exhaust gas from the cathode 112 to the anode 116. Further, the compressor (26A, 26B) is configured to compress $CO_2$ rich gas derived from outlet gas of the anode 116 of the fuel cell 110, and the anode 116 of the fuel cell 110 is configured to be supplied with high-pressure fuel gas from which power has been recovered by the expander 4.

The configuration of the plant 1 depicted in FIGS. 10 and 11 will be described below. A1 to A4 in FIG. 10 represent the same sections as A1 to A4 in FIG. 6, and B1 to B5 in FIG. 11 represent the same sections as B1 to B5 in FIG. 7.

Figure 1:
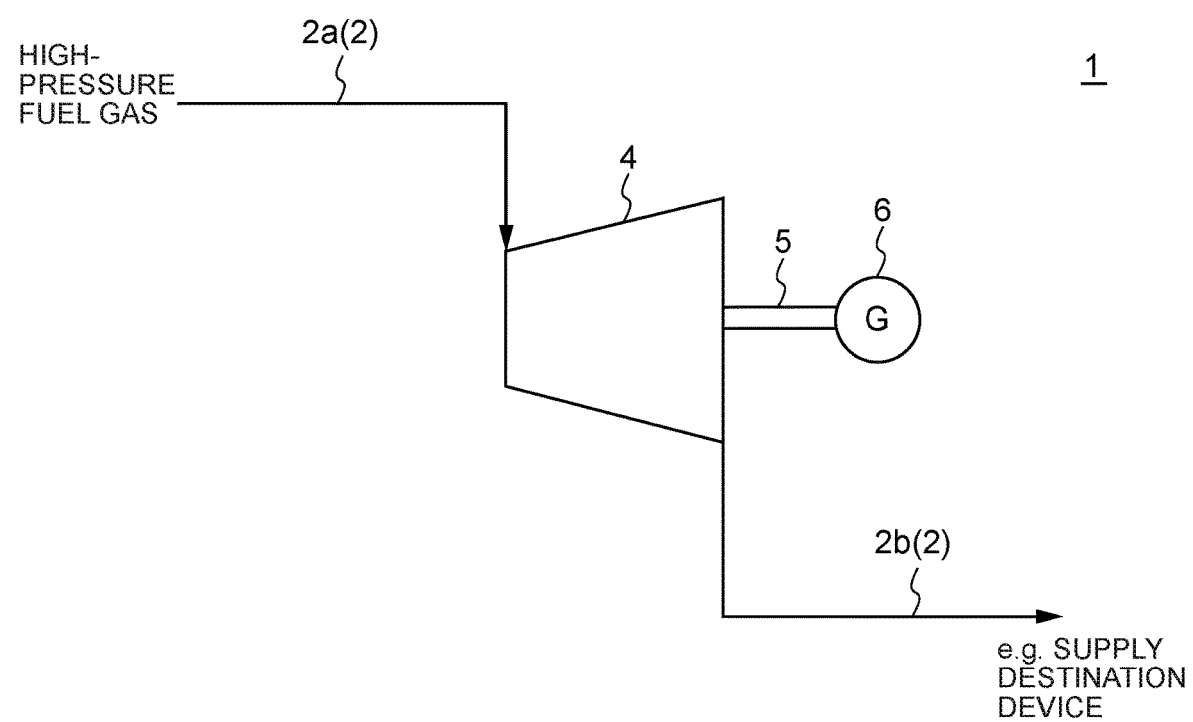
FIG. 1 is a schematic configuration diagram of a plant according to an embodiment.

The plant 1 depicted in FIGS. 10 and 1 is a thermal power generation facility that includes a thermal power generation device 102 and a carbon dioxide recovery system 103. The carbon dioxide recovery system 103 is configured to recover carbon dioxide ($CO_2$) contained in exhaust gas from the thermal power generation device 102.

The thermal power generation device 102 is a device that generates power by using combustion gas or combustion heat generated by combustion of fuel. For instance, the thermal power generation device 102 may be a power generation device including a boiler or a gas turbine, or a power generation device such as a gas turbine combined cycle power generation device (GTCC) or an integrated coal gasification combined cycle power generation device (IGCC), for instance. In the illustrative embodiment depicted in FIGS. 10 and 11, the thermal power generation device 102 is a power generation device that generates power using combustion gas of the gas turbine 200.

The carbon dioxide recovery system 103 is configured to recover $CO_2$ contained in exhaust gas that contains gas generated from combustion in the thermal power generation device 102. For instance, in a case where the thermal power generation device 102 includes a boiler or a gas turbine including a combustor, the carbon dioxide recovery system 103 may be configured to recover $CO_2$ contained in exhaust gas from the boiler or the gas turbine. Alternatively, in a case where the thermal power generation device 102 includes a waste-heat recovery boiler (heat recovery steam generator; HRSG) for recovering heat of exhaust gas from the gas turbine or the like, the carbon dioxide recovery system 103 may be configured to recover $CO_2$ contained in exhaust gas from the waste-heat recovery boiler.

In the illustrative embodiment depicted in FIGS. 10 and 11, the thermal power generation device 102 is a power generation device that includes the gas turbine 200. In the embodiment depicted in FIGS. 10 and 11, the carbon dioxide recovery system 103 is configured to recover $CO_2$ contained in exhaust gas from the gas turbine 200.

The gas turbine 200 depicted in FIGS. 10 and 11 includes a compressor 202 for producing compressed air, a combustor 204 for producing combustion gas by combusting a fuel (e.g. natural gas), and a turbine 206 configured to be rotary driven by combustion gas.

The combustor 204 is supplied with fuel (e.g. natural gas) from a fuel storage part 122. Further, air compressed by the compressor 202 is sent into the combustor 204, and the compressed air has a function of an oxidizing agent in combustion of fuel at the combustor 204.

A generator 208 is coupled to the turbine 206 via a rotational shaft 203. The generator 208 is driven by rotational energy of the turbine 206, and thereby electric power is generated. The combustion gas having worked at the turbine 206 is discharged from the turbine 206 as exhaust gas.

In the illustrative embodiment depicted in FIGS. 10 and 11, the carbon dioxide recovery system 103 includes the above described fuel cell 110, and a $CO_2$ rich gas line (anode outlet flow passage) 24 connected to the outlet side of the anode 116 of the fuel cell 110 and configured to guide $CO_2$ rich gas derived from the outlet gas of the anode 116. The $CO_2$ contained in exhaust gas from the thermal power generation device 102 is recovered via the fuel cell 110 and the $CO_2$ rich gas line 24 as described below.

In the present specification, the $CO_2$ rich gas derived from the outlet gas of the anode may be the anode outlet gas itself, or gas after performing a predetermined treatment on the anode outlet gas (e.g. CO shift reaction in a CO shift reactor 120 described below, or membrane separation at the gas separation unit 136). Further, the $CO_2$ rich gas refers to a gas having a higher $CO_2$ concentration than exhaust gas to be processed.

As described above, the fuel cell 110 includes an anode (fuel pole) 116, a cathode (air pole) 112, and an electrolyte 114. The cathode 112 is supplied with exhaust gas (exhaust gas containing $CO_2$) from the thermal power generation device 102. Furthermore, fuel gas containing hydrogen ($H_2$) is supplied to the anode 116. The electrolyte 114 is configured to transfer carbonate ion ($CO_3^{2-}$) derived from $CO_2$ contained in exhaust gas from the cathode 112 to the anode 116.

The fuel cell 110 may be a molten carbonate fuel cell (MCFC) using carbonate as the electrolyte 114. The carbonate used as the electrolyte 114 may be lithium carbonate, sodium carbonate, potassium carbonate, or combination of the above.

The cathode 112 is supplied with exhaust gas containing $CO_2$ from the thermal power generation device 102 via the cathode inlet flow passage 170.

A fuel storage part 122 storing a fuel (e.g. natural gas) is connected to the anode 116 via an anode inlet flow passage 176 and the fuel supply line 2. The fuel inside the fuel storage part 122 is reformed into hydrogen ($H_2$) in a pre-reformer 124 disposed in the fuel supply line 2 or the reforming part 118 disposed in the fuel cell 110, for instance, and is supplied to the anode 116 via the anode inlet flow passage 176.

At the cathode 112 of the fuel cell 110, $CO_2$ and oxygen ($O_2$) contained in exhaust gas from the thermal power generation device 102 reacts with electrons and thereby carbonate ion ($CO_3^{2-}$) is produced. The carbonate ion produced at the cathode 112 transfers through the electrolyte 114 toward the anode 116.

On the other hand, at the anode 116 of the fuel cell 110, the hydrogen ($H_2$) supplied via the anode inlet flow passage 176 reacts with carbonate ion ($CO_3^{2-}$) that has transferred through the electrolyte 114, and thereby water ($H_2O$), $CO_2$, and electrons are produced. As described above, $CO_2$ supplied to the cathode 112 transfers through the electrolyte 114 in the form of cathode ion from the cathode 112 to the anode 116, and becomes $CO_2$ after reaction at the anode 116.

$CO_2$ generated at the anode 116 flows out to the $CO_2$ rich gas line (anode outlet flow passage) 24 as gas mixture (outlet gas of the anode 116) with $H_2O$ and non-combusted components of the fuel gas (e.g. CO and $H_2$). The anode outlet gas that flows out to the $CO_2$ rich gas line 24 is a $CO_2$ rich gas having a higher $CO_2$ concentration than exhaust gas to be processed.

$CO_2$ contained in the $CO_2$ rich gas discharged from the anode 116 is recovered via the $CO_2$ rich gas line 24. Further, the recovered $CO_2$ (i.e. $CO_2$ recovered to the side of the anode 116 by the fuel cell 110) may be compressed by the compressor 109 (see FIG. 11).

Meanwhile, the reforming reaction of the fuel is an endothermic reaction, and it is normally necessary to add heat from outside. Thus, as depicted in FIGS. 10 and 11, at the upstream side of the reforming part 118, a heat exchanger 126 for heating the fuel to be supplied to the reforming part 118 via the fuel supply line 2 may be disposed. By heating the fuel with the heat exchanger 126 and then supplying the fuel to the reforming part 118, it is possible to cause the reforming reaction of the fuel efficiently.

Further, in the embodiment depicted in FIGS. 10 and 11, the heat exchanger 126 is configured to heat the fuel supplied from the fuel supply line 2 to the reforming part 118 through heat exchange with the outlet gas ($CO_2$ rich gas) of the anode 116.

The molten carbonate fuel cell operates at a high temperature of approximately 600 to 700° C., and gas that flows out from the anode 116 has a high temperature of the same level. Thus, with the above described heat exchanger 126, it is possible to cause the reforming reaction of the fuel while effectively utilizing the reaction heat generated at the fuel cell 110.

Further, in the embodiment depicted in FIGS. 10 and 11, a combustor 119 for combusting a fuel (fuel from the fuel storage part 122, for instance) is disposed in the cathode inlet flow passage 170.

Furthermore, for appropriate operation of the fuel cell 110, the temperature of supplied gas should have a high temperature of a certain level in some cases. In such a case, by combusting fuel at the combustor 119 and increasing the temperature of exhaust gas at the inlet side of the cathode 112 with combustion heat, the fuel cell 110 can be operated appropriately.

In the illustrative embodiment depicted in FIGS. 10 and 11, a CO shift reactor 120 for denaturing CO contained in $CO_2$ rich gas is disposed in the $CO_2$ rich gas line 24. The CO shift reactor 120 is configured to convert CO contained in $CO_2$ rich gas into $CO_2$ through reaction with water ($H_2O$).

By denaturing CO with the CO shift reactor 120, it is possible to increase the $CO_2$ concentration in the $CO_2$ rich gas line 24 downstream of the CO shift reactor 120 compared to that upstream of the CO shift reactor 120. Accordingly, it is possible to recover purer carbon dioxide.

In the illustrative embodiment depicted in FIG. 10, a gas separation unit 136 for separating a gas component in the $CO_2$ rich gas is disposed in the $CO_2$ rich gas line 24.

The gas separation unit 136 may be configured to separate $CO_2$ from $CO_2$ rich gas supplied to the gas separation unit 136. By separating $CO_2$ from the $CO_2$ rich gas with the gas separation unit 136, it is possible to increase the $CO_2$ concentration in the $CO_2$ rich gas line 24 downstream of the gas separation unit 136 compared to that upstream of the gas separation unit 136. Accordingly, it is possible to recover purer carbon dioxide.

The gas separation unit 136 may include a separation membrane configured to separate $CO_2$ from the $CO_2$ rich gas. Alternatively, the gas separation unit 136 may be configured to separate $CO_2$ from $CO_2$ rich gas by the cryogenic distillation method.

Furthermore, as depicted in FIG. 10, in the $CO_2$ rich gas line 24, a compressor 134 for increasing the pressure of $CO_2$ rich gas to a pressure suitable for a separation method adapted by the gas separation unit 136 may be disposed upstream of the gas separation unit 136.

In the embodiment depicted in FIG. 11, $CO_2$ rich gas flowing through the $CO_2$ rich gas line 24 is guided to the compressor (26A, 26B) (see FIG. 7) via the upstream $CO_2$ rich gas line 24*a*. Further, the $CO_2$ rich gas having passed through the compressor (26A, 26B) is guided to the $CO_2$ separation device 40 (see FIG. 7; corresponding to the above described gas separation unit 136) from the downstream $CO_2$ rich gas line 24*b* (see FIG. 7), and $CO_2$ is separated from the $CO_2$ rich gas at the $CO_2$ separation device 40. The $CO_2$ separated from the $CO_2$ rich gas at the $CO_2$ separation device 40 is recovered via the $CO_2$ recovery line 24*c*.

In some embodiments, as depicted in FIGS. 10 and 11, exhaust gas from the thermal power generation device 102 is supplied to the cathode 112 of the fuel cell 110, and is supplied to the waste-heat recovery boiler 140 via the bypass flow passage 178 branched from the cathode inlet flow passage 170.

The waste-heat recovery boiler 140 depicted in FIGS. 10 and 11 includes a duct to which exhaust gas from the thermal power generation device 102 is guided (not depicted) and a heat exchanger (not depicted) disposed in the duct. The heat exchanger is configured to generate steam through heat exchange with exhaust gas flowing through the duct. The steam generated by the waste-heat recovery boiler 140 is guided to the steam turbine 142 and rotary drives the steam turbine 142. Further, a generator 144 is connected to the steam turbine 142, and the generator 144 is configured to generate electric power by being rotary-driven by the steam turbine 142.

In the illustrative embodiment depicted in FIG. 11, exhaust gas having flown through the duct of the waste-heat recovery boiler 140 and passed through the heat exchanger is discharged from a stack 146.

In the illustrative embodiment depicted in FIG. 10, exhaust gas having flown through the duct of the waste-heat recovery boiler 140 is discharged from the waste-heat recovery boiler via the duct outlet and guided to the chemical absorption tower 130.

That is, in the illustrative embodiment depicted in FIG. 10, in addition to the $CO_2$ recovery via the fuel cell 110 and the $CO_2$ rich gas line 24 described above, the chemical absorption tower 130 is used to recover $CO_2$ contained in exhaust gas from the thermal power generation device 102.

As depicted in FIG. 10, exhaust gas from the thermal power generation device 102 is guided to the chemical absorption tower 130 via the cathode outlet flow passage 172 of the fuel cell 110 and/or the bypass flow passage 178. Furthermore, exhaust gas guided to the chemical absorption tower 130 may contain, as depicted in FIG. 10, exhaust gas after heat recovery at the waste-heat recovery boiler 140.

At the chemical absorption tower 130 according to an embodiment, an absorption liquid (e.g. absorption liquid containing amine) makes contact with exhaust gas guided to the chemical absorption tower 130, and thereby $CO_2$ contained in exhaust gas is absorbed by the absorption liquid. Accordingly, $CO_2$ is removed from exhaust gas. The exhaust gas deprived of $CO_2$ is discharged from the outlet 130*a* of the chemical absorption tower 130 as processed exhaust gas.

The absorption liquid having absorbed $CO_2$ is sent to the regeneration tower 132 from the chemical absorption tower 130, and is regenerated at the regeneration tower 132. At the regeneration tower 132, the absorption liquid having absorbed $CO_2$ is heated by steam, and thereby $CO_2$ is separated and removed from the absorption liquid (that is, the absorption liquid is regenerated).

The gas containing $CO_2$ removed from the absorption liquid is discharged from the regeneration tower 132 and deprived of moisture at a gas-liquid separator (not depicted), and then $CO_2$ is recovered as a gas.

On the other hand, the absorption liquid regenerated after removal of $CO_2$ at the regeneration tower 132 is returned to the chemical absorption tower 130, and is used again to absorb $CO_2$ contained in exhaust gas from the thermal power generation device 102.

In the embodiment depicted in FIGS. 10 and 11, the above described expander 4 is disposed in the fuel supply line 2 for supplying the fuel from the fuel storage part 122 to the anode 116, at the A1 to A2 section in FIG. 10 and the B1 to B2 section in FIG. 11 (see FIGS. 6 and 7). High-pressure fuel gas from the fuel storage part 122 flows into the fuel supply line 2. The expander 4 extracts power from the high-pressure fuel gas by expanding the high-pressure fuel gas. Furthermore, at the upstream side of the expander 4 in the fuel supply line 2, the heater 22 is disposed.

Furthermore, in the embodiment depicted in FIGS. 10 and 11, the above described compressor (26A, 26B) is disposed in $CO_2$ rich gas line 24 at the outlet side of the anode 116 of the fuel cell 110, at the A3 to A4 section in FIG. 10 and the B3 to B4 section and the B3 to B5 section in FIG. 11 (see FIGS. 6 and 7). The compressor (26A, 26B) is configured to compress $CO_2$ rich gas that flows through the $CO_2$ rich gas line 24. Further, the heater 22 is configured to heat high-pressure fuel gas flowing through the fuel supply line 2 with waste heat of the compressor (26A, 26B).

Further, in the embodiment depicted in FIGS. 10 and 11, the electric motor 28 for driving the compressor (26A, 26B) may be supplied with at least a part of the electric power generated at the fuel cell 110.

In the embodiment depicted in FIG. 10, $CO_2$ ($CO_2$ rich gas) pressurized by the compressor (26A, 26B) is recovered via the downstream $CO_2$ rich gas line 24b.

Further, in the illustrative embodiment depicted in FIG. 11, at the B3 to B5 section in FIG. 11, a $CO_2$ separation device 40 is disposed in the $CO_2$ rich gas line 24 at the downstream side of the compressor (26A, 27B) (see FIG. 7). Further, from $CO_2$ separated from the $CO_2$ rich gas at the $CO_2$ separation device 40, $CO_2$ compressed by the compressor (26A, 26B) ($CO_2$ rich gas) is recovered via the $CO_2$ recovery line 24c. Further, the impurity gas containing $H_2$ or $CO_2$ that is removed from the $CO_2$ rich gas line at the $CO_2$ separation device 40 flows into the fuel supply line 2 via the discharge line 30, and the impurity gas is supplied to the anode 116 of the fuel cell 110 via the pre-reformer 124 and the reforming part 118 of the fuel cell 110.

As depicted in FIGS. 10 and 11, by pressurizing the $CO_2$ rich gas with the compressor (26A, 26B) as described above, it is possible to use pressurized $CO_2$ rich gas in enhanced oil recovery (EOR), or seal and fix $CO_2$ in the rock ground or under the sea. Further, by heating high-pressure fuel gas at the heater 22 by utilizing waste heat of the compressor 26 (26A, 26B) for pressurizing $CO_2$ rich gas, it is possible to recover more power at the expander 4, and improve the output and the efficiency of the plant as a whole even further.

Further, as depicted in FIG. 11, by separating $CO_2$ from $CO_2$ rich gas using the $CO_2$ separation device 40, it is possible to obtain $CO_2$ with a high purity. Further, in a case where the $CO_2$ rich gas contains combustible gas (e.g. $H_2$ or CO) as an impurity substance, it is possible to improve the energy efficiency of a plant as a whole by utilizing the impurity gas obtained by the $CO_2$ separation device 40 as a fuel at the fuel cell 110 or the like.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have" and "contain" are not intended to be exclusive of other components.

DESCRIPTION OF REFERENCE NUMERALS

1 Plant
2 Fuel supply line
2a Upstream fuel supply line
2b Downstream fuel supply line
4 Expander
5 Rotational shaft
6 Generator
10 Fuel tank
12 Pump
14 Heat exchanger
16 Compressor
20 Gasification furnace
22 Heater
24 $CO_2$ rich gas line
24a Upstream $CO_2$ rich gas line
24b Downstream $CO_2$ rich gas line
26A, 26A' Compressor
26B Compressor
27 Rotational shaft
28 Electric motor
30 Discharge line
30 Cooling medium line
32 Heat exchanger
34 Solidifier
44 Freezer
49 Pump
50 Gasifier
50a First chamber
50b Second chamber
52 Lid part
54 Lid part
56 Heat source
102 Thermal power generation device
103 Carbon dioxide recovery system
109 Compressor
110 Fuel cell
112 Cathode
114 Electrolyte
116 Anode
118 Reforming part
119 Combustor
120 CO shift reactor
122 Fuel storage part
124 Pre-reforming part
126 Heat exchanger
130 Chemical absorption tower
130a Outlet
132 Regeneration tower
134 Compressor
136 Gas separation unit
140 Waste-heat recovery boiler
142 Steam turbine
144 Generator
146 Stack
170 Cathode inlet side flow passage
172 Cathode outlet side flow passage
176 Anode inlet side flow passage
178 Bypass flow passage
200 Gas turbine
202 Compressor
203 Rotational shaft
204 Combustor
206 Turbine
208 Generator

The invention claimed is:

1. A plant, comprising:
a fuel supply line for supplying high-pressure fuel gas; and
at least one expander disposed in the fuel supply line and configured to extract power from the high-pressure fuel gas by expanding the high-pressure fuel gas;
a heater, disposed in the fuel-supply line at an upstream side of an expander of the at least one expander, for heating the high-pressure fuel gas flowing into the expander;
a $CO_2$ rich gas line through which $CO_2$ rich gas flows; and
at least one compressor, disposed in the $CO_2$ rich gas line, for pressurizing the $CO_2$ rich gas,
wherein the heater is configured to heat the high-pressure fuel gas by using waste heat of the at least one compressor,
wherein the plant further comprises a fuel cell which includes an anode, a cathode supplied with exhaust gas containing carbon dioxide, and an electrolyte configured to transfer carbonate ion derived from the carbon dioxide contained in the exhaust gas from the cathode to the anode,
wherein the at least one compressor is configured to compress the $CO_2$ rich gas derived from an outlet gas of the anode, and
wherein the anode of the fuel cell is configured to be supplied with the high-pressure fuel gas from which power has been recovered by the at least one expander.

2. The plant according to claim 1,
wherein the at least one expander includes a plurality of expanders disposed so as to be arranged in a flow direction of the high-pressure fuel gas, and
wherein the plant comprises a plurality of heaters, each disposed in the fuel-supply line at an upstream side of corresponding one of the plurality of expanders, for heating the high-pressure fuel gas flowing into the corresponding expander.

3. A plant, comprising:
a fuel supply line for supplying high-pressure fuel gas; and
at least one expander disposed in the fuel supply line and configured to extract power from the high-pressure fuel gas by expanding the high-pressure fuel gas;
at least one heater, disposed in the fuel-supply line at an upstream side of an expander of the at least one expander, for heating the high-pressure fuel gas flowing into the expander;
a $CO_2$ rich gas line through which $CO_2$ rich gas flows; and
at least one compressor, disposed in the $CO_2$ rich gas line, for pressurizing the $CO_2$ rich gas,
wherein the at least one heater is configured to heat the high-pressure fuel gas by using waste heat of the at least one compressor,
wherein the at least one expander includes a plurality of expanders disposed so as to be arranged in a flow direction of the high-pressure fuel gas,
wherein the at least one heater includes a plurality of heaters, each disposed in the fuel-supply line at an upstream side of corresponding one of the plurality of expanders, for heating the high-pressure fuel gas flowing into the corresponding expander,
wherein the at least one compressor includes a plurality of compressors disposed in series in the $CO_2$ rich gas line, and
wherein each of the at least one heater is configured to heat the high-pressure fuel gas through heat exchange with the $CO_2$ rich gas flowing between a pair of adjacent compressors among the plurality of compressors.

4. A plant, comprising:
a fuel supply line for supplying high-pressure fuel gas; and
at least one expander disposed in the fuel supply line and configured to extract power from the high-pressure fuel gas by expanding the high-pressure fuel gas;
a heater, disposed in the fuel-supply line at an upstream side of an expander of the at least one expander, for heating the high-pressure fuel gas flowing into the expander;
a $CO_2$ rich gas line through which $CO_2$ rich gas flows; and
at least one compressor, disposed in the $CO_2$ rich gas line, for pressurizing the $CO_2$ rich gas,
wherein the heater is configured to heat the high-pressure fuel gas by using waste heat of the at least one compressor,
wherein the at least one compressor includes a plurality of compressors disposed in series in the $CO_2$ rich gas line, and
wherein the heater is configured to heat the high-pressure fuel gas through heat exchange with the $CO_2$ rich gas flowing between a pair of adjacent compressors among the plurality of compressors,
wherein the at least one compressor includes:
a plurality of upstream compressors disposed in the $CO_2$ rich gas line with the heater interposed between a pair of adjacent compressors; and
at least one downstream compressor disposed in the $CO_2$ rich gas line at a downstream side of the upstream compressors, and
wherein the plant further comprises a heat exchanger disposed in the $CO_2$ rich gas line between the downstream compressor and a most downstream compressor of the plurality of upstream compressors, or between a pair of the downstream compressors, the heat exchanger being configured to cool the $CO_2$ rich gas by using a cooling medium other than the high-pressure fuel gas.

5. The plant according to claim 1, further comprising:
a $CO_2$ separation device, disposed in the $CO_2$ rich gas line at a downstream side of the at least one compressor, for separating $CO_2$ from the $CO_2$ rich gas pressurized by the at least one compressor.

6. The plant according to claim 1,
wherein the at least one compressor is configured to be driven by using the power extracted by the at least one expander.

7. The plant according to claim 4,
wherein the at least one expander includes a plurality of expanders disposed so as to be arranged in a flow direction of the high-pressure fuel gas, and
wherein the plant comprises a plurality of heaters, each disposed in the fuel-supply line at an upstream side of corresponding one of the plurality of expanders, for heating the high-pressure fuel gas flowing into the corresponding expander.

8. The plant according to claim 3, further comprising:
a $CO_2$ separation device, disposed in the $CO_2$ rich gas line at a downstream side of the at least one compressor, for separating $CO_2$ from the $CO_2$ rich gas pressurized by the at least one compressor.

9. The plant according to claim 4, further comprising:
a $CO_2$ separation device, disposed in the $CO_2$ rich gas line at a downstream side of the at least one compressor, for separating $CO_2$ from the $CO_2$ rich gas pressurized by the at least one compressor.

10. The plant according to claim 3, wherein the at least one compressor is configured to be driven by using the power extracted by the at least one expander.

11. The plant according to claim 4, wherein the at least one compressor is configured to be driven by using the power extracted by the at least one expander.

* * * * *